Jan. 23, 1962  H. A. WAGNER  3,018,425
CURRENT RECTIFIER ASSEMBLY
Filed Sept. 25, 1959

WITNESSES

INVENTOR
Harold A. Wagner
BY
ATTORNEY

United States Patent Office 3,018,425
Patented Jan. 23, 1962

3,018,425
CURRENT RECTIFIER ASSEMBLY
Howard A. Wagner, North Huntingdon, Pa., assignor to Westinghouse Electric Corporation, East Pittsburgh, Pa., a corporation of Pennsylvania
Filed Sept. 25, 1959, Ser. No. 842,397
4 Claims. (Cl. 317—234)

This invention relates to current rectifying apparatus and more particularly to rectifier assemblies including a solid state rectifier element.

In rectifying alternating current, it is common practice to use individual unitized diodes or rectifier elements which are attached individually to heat dissipating plates which in turn are connected together mechanically and electrically to form a compact assembly called a rectifier stack. Terminals or leads are provided for direct current output and alternating current input and usually some mounting means is provided in the way of an insulated through bolt, insulated legs or holes in one or more plates to facilitate grounding one terminal as well as mounting the assembly.

The individual diodes are usually hermetically sealed in some encapsulation medium, such as glass, to protect the diode surface. Connection to a heat dissipating plate is then usually made only by bolting. It is desirable to avoid the encapsulation step because of the expense incurred and because of the reduction in efficiency, due to bolted connections, which results.

In accordance with the present invention, individual encapsulation of diodes prior to assembly is unnecessary because means are provided to adequately protect the diode after the assembly.

Many different arrangements of plates, connecting buses and supports are possible to form a rectifier assembly, not all of which may be readily fabricated to form a compact unit at low cost.

It is therefore an object of this invention to provide a rectifier assembly of low weight and compact structure.

Another object is to provide a rectifier assembly comprising identically fabricated subassemblies.

Another object is to provide a rectifier assembly which may be readily fabricated.

Another object is to provide a rectifier assembly which is not subject to harmful effects of differential thermal expansion.

Another object is to provide unitary rectifier structures adaptable to be readily fabricated into a three-phase, full wave bridge.

Another object is to provide a rectifier assembly, wherein the rectifying diode is adequately protected without encapsulation prior to assembly.

These and other objects and a fuller understanding of this invention may be had by referring to the following description and claims, taken in conjunction with the accompaying drawings in which:

Figure 1:
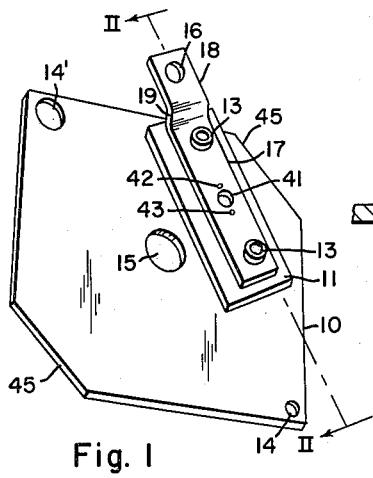
FIGURE 1 shows a perspective view of a plate strap rectifier subassembly in accordance with this invention.
Figure 2:
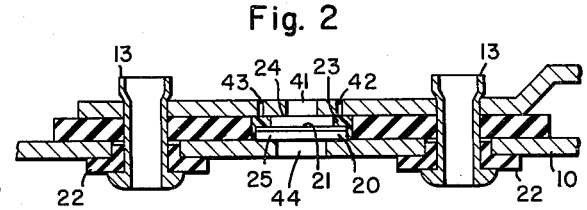
FIG. 2 shows a sectional view of the plate strap rectifier subassembly shown in FIG. 1.

Refering now to FIG. 1, there is shown an electrically conductive and heat dissipating plate 10 of a generally square configuration and having a small thickness. An insulating member 11 of a generally rectangular shape is disposed on the plate 10 in an off-center position, and an elongated thin strap conductor 12 is disposed on the insulating member 11. A solid state rectifying element 20 is contained within the insulating member 11 as is shown in FIG. 2. The strap 12 is mechanically joined to the plate 10 by rivet means 13 which extend through the plate 10, the insulating member 11 and a first portion 17 of the strap 12. The strap 12 also comprises a second portion 18 parallel to the first portion 17 and extending beyond the periphery plate 10. The extreme end of the second strap portion 18 is provided with terminal means 16. The first and second strap portions are separated and connected by an offset 19.

The plate 10 is provided with terminal means 14 and 14', a center aperture 15 and corner cutouts 45, the purpose of which will be more apparent as explained hereinafter.

In addition to holes for the rivet means 13, the first strap portion 17 is provided with a soldering hole 41 and sealing holes 42 and 43. The purpose of these will be more fully discussed hereinafter.

Referring to FIG. 2, there is shown within the insulating member 11 a solid state rectifying element or diode 20. The diode 20 is a body of semiconductor material, such as silicon, having therein a rectifying junction 21 separating material of different conductivity type. The solid state diode is well known and its operation will not be discussed herein except to say the rectifying junction 21 enables current to flow much more readily in one direction than in the opposite direction across said junction. The rectifying junction is situated parallel to two faces, 24 and 25, of the diode. One of the faces 25, of the rectifying element is soldered to the plate 10 and the other face 24 is soldered to the strap 12.

The insulating member 11 is of a solid having an aperture of diameter substantially equal to the large diameter of the rectifying element. Any suitable insulating material may be used for this purpose, such as a glass silicone. The purpose served by the body of insulating material 11 is to insulate the plate 10 from the strap 12 so that there is no conductive path between the plate 10 and the strap 12, except through the rectifying element 20. For this same purpose, rivet means 13 is insulated from the plate 10 by insulating washers 22 which may also be of a glass silicone material. To more completely protect the surface of the rectifying element 20, other insulating material 23 such as a silicon resin may be forced into the space between the rectifying element 20 and the body of insulating material 11.

The insulating material 23 is of a nature such that it may be injected through one of the sealing holes 42 in the strap 12 to fill the space between the small diameter of the rectifying element 20 and the insulating member 11. The injection of the material 23 may be carried out until the material begins to come out of the second sealing hole 43 at which time it is known that voids in the structure have been filled.

A first soldering hole 41 is provided in the strap 12 and a second soldering hole 44 is provided in the plate 10, on opposite sides of the rectifying element 20, so that material may be there inserted to solder the plate 10 and the strap 12 to the rectifying element 20. The solder is spread over the faces 24 and 25 of the rectifying element by reason of capillary action so that good contact over a relatively large area is achieved.

Figure 3:
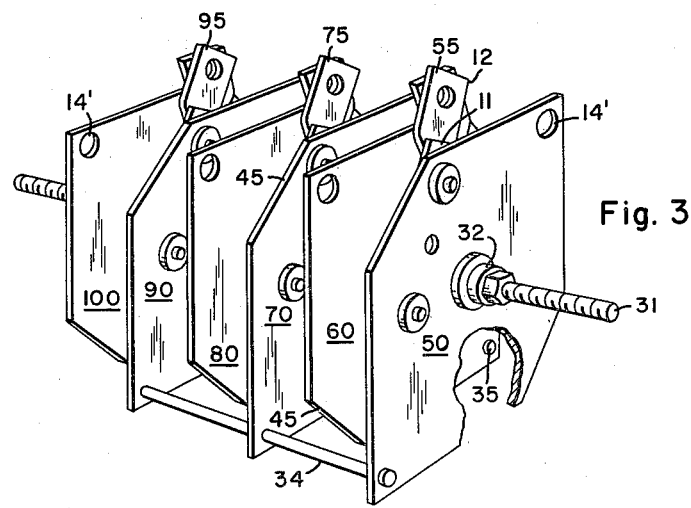
FIG. 3 shows a perspective view of a stack of plate strap rectifier subassemblies in accordance with this invention forming a three-phase full wave rectifier bridge; and, FIG. 4 shows the equivalent circuit of the assembly shown in FIG. 3.

FIG. 3 shows a stack of six subassemblies as shown in FIGS. 1 and 2. The subassemblies are held together by means of through-bolt 31 which extends through the center apertures 15 (as shown in FIG. 1) of the parallel plates 10. Insulating spacers 32 are provided to insulate the through-bolt 31 from the plates. The adjacent subassemblies are identical in appearance. However, when disposed in a stack on the through-bolt 31 the first, third, and fifth subassemblies 50, 70 and 90 have the diode-containing insulating members 11 and straps 12 facing in one direction while the second, fourth and sixth subassemblies 60, 80 and 100 have the diode and strap facing in the opposite direction. Adjacent diodes and straps of the first and second, third and fourth, and fifth and sixth subassemblies are thereby brought into facing relationship to each other. The first, third and fifth subassemblies 50, 70 and 90 contain rectifying elements of opposite polarity than those in the second, fourth and sixth subassemblies 60, 80 and 100. That is, in one case current flows readily from the strap side of the rectifying element to the plate side while in the other case the forward direction of current is from the plate side of the rectifying element to the strap side. In this manner, straps 12 of adjacent subassemblies such as 50 and 60, 70 and 80, and 90 and 100 are brought into contact providing the A.C. terminals 55, 75 and 95 of the unit. The plate holes 14 of the first, third and fifth subassemblies 50, 70 and 90 are interconnected by means of conductive rod 34. The conductive rod 34 by-passes the second, fourth and sixth subassemblies 60, 80 and 100 by reason of the plate cutouts 45. To provide a positive D.C. output terminal, connection may be made to conductive rod 34. The plate holes 14 in the second, fourth and sixth subassemblies 60, 80 and 100 are interconnected by conductive rod 35 to form the negative D.C. output terminal. The plate cutouts 45 also enable rod 35 to bypass alternate plates. Actual contact to a load may be made by connection to terminal holes 14' in any two adjacent plates.

Figure 4:
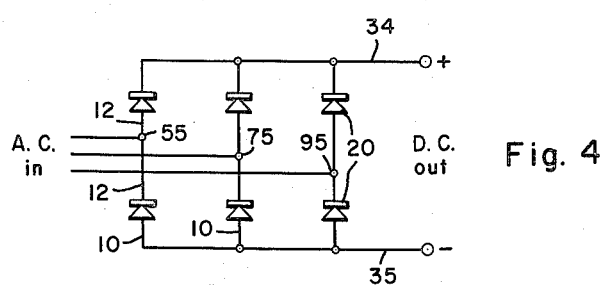

FIG. 4 shows the equivalent circuit of the assembly shown in FIG. 3, commonly known as a three-phase bridge circuit. Operation of this circuit is well known in the art and reference may be made to S. P. Jackson, Selection and Application of Metallic Rectifiers, McGraw-Hill Book Co., Inc., New York, 1957, on pages 28 and 30 for fuller description.

Obviously other rectifier assemblies may be formed using subassemblies constructed in accordance with my invention. For example, a pair of subassemblies could be employed to provide a full wave center tap transformer connection wherein the winding is connected across the two plates and a center tap is provided at the contact of the two straps. Also, four of the subassemblies may be used for a full wave, no center tap connection. In this embodiment, A.C. would be applied to the contacts of the two pairs of straps and D.C. would be derived from alternate plates, the first and third and the second and fourth of which are connected in a manner similar to that shown in FIG. 3.

Since both the plates 10 and the strap 12 of each rectifier subassembly are made from similar metals, thermal expansion does not cause undue stresses to be set up in the soldered joints. Also, the distance between the two rivets 13 holding the plate and strap 12 together allow some flexibility for thermal expansion while the offset 19 in the length of the strap 12 outside the restrained section 17 is such that mechanical strains due to making electrical connections are not transferred along or through the strap 12 to the soldered joints of the cells 24 and 25.

The offset 19 of the strap 12 allows connection to be readily made to adjoining straps in fabricating a rectifier stack as shown in FIG. 3 and also permits more air to pass between plates to provide cooling.

It can be readily seen that the individual subassemblies comprising a plate 10, a strap 12 and an insulating member 11 containing a rectifying element 20 may be fabricated from identical components except for the rectifying elements 20 which must necessarily be half of p-type conductivity and half of n-type conductivity. This uniformity of components greatly simplifies fabrication. Moreover, the structure of FIG. 3 where the A.-C. terminals 55, 75 and 95 of the bridge are provided by the joining of adjacent straps 12, does away with the necessity of A.-C. bus bars.

An important advantage derived from the disclosed structure is that the entire three phase, full wave bridge assembly may be inexpensively fabricated. The diode element 20 itself needs no surface protection until after soldering to the plate 10 and strap 12 when it can be done inexpensively. This advantage is made possible by employing the insulating cell 11 so that the diode 20 is adequately protected. It may thereafter be more completely sealed by injecting a void filling insulating material 23.

Another important advantage derived from the disclosed structure is that better electrical contact may be made between the rectifying element 20 and the plate 10 and strap 12 when the rectifying element 20 has not been first hermetically encapsulated. Therefore, improved efficiency as well as reduced expense is achieved.

While the present invention has been described with reference to certain preferred embodiments, it will be apparent to those skilled in the art that the practice of this invention may assume other forms and modifications without departing from the spirit and scope thereof.

I claim as my invention:

1. Current rectifying apparatus comprising: a thermally and electrically conductive plate having an aperture therethrough; a solid state rectifying element having a first face and a second face; an insulating member substantially enclosing said rectifying element except for said first and second faces; said first face being conductively attached to said plate around said aperture by solder placed in said aperture; an electrically conductive strap member having a first portion conductively attached to said second face of said rectifying element; said insulating member being fixedly disposed between said plate and said strap.

2. Current rectifying apparatus comprising: a thermally and electrically conductive plate having an aperture at the approximate center thereof and terminal means at the periphery thereof; a solid state rectifying element having a first face and a second face, said first face being electrically attached to said plate around said aperture by solder placed in said aperture; said rectifying element being enclosed by insulating material except for said first and second faces; an electrically conductive strap member conductively attached to said second face of said rectifying element, said strap member having a portion thereof extending beyond the periphery of said plate and having terminal means at the extreme end thereof; and fastening means mechanically connecting said plate and said strap member.

3. Current rectifying apparatus of the three phase full wave bridge type comprising: six thermally and electrically conductive plates having apertures at the approximate center thereof; a through bolt disposed through said plate apertures mechanically securing said plates in a unit, said through bolt being electrically insulated from said plates; each of said plates having disposed thereon a solid state rectifying element having a first face in conductive contact with said plate; each of said rectifying elements having conductively attached to the second face thereof a conductive strap member; the first, third and fifth of said plates having thereon rectifying elements of the first polarity and said second, fourth and sixth of said plates having thereon rectifying elements of the second polarity; adjacent plates being so disposed that the rectifying elements and straps thereon are in facing relationship such that adjacent strap members are in electrical contact comprising three terminals for the input of alternating current; conductive means electrically connecting said first, third and fifth plates; conductive means electrically connecting said second, fourth and sixth plates, said two conductive means providing terminals for the output of direct current.

4. A rectifier assembly comprising first and second conductive members having an insulating member fixedly disposed therebetween; said insulating member having a solid state rectifying element so disposed therein that a first face of said solid state rectifying element is in contact with said first conductive member and a second face of said solid state rectifying element is in contact with said second conductive member; said first conductive member having an aperture therein, solder in said aperture attaching said first face of said solid state rectifying element to said first conductive member; said second conductive member having an aperture therein, solder in said aperture in said second conductive member attaching said face of said solid state rectifying element to said second conductive member; said first and second conductive members providing terminals for said solid state rectifying element.

References Cited in the file of this patent

UNITED STATES PATENTS

| | | |
|---|---|---|
| 2,495,353 | Smith | Jan. 24, 1950 |
| 2,791,731 | Walker et al. | May 7, 1957 |
| 2,792,537 | Martin | May 14, 1957 |
| 2,802,158 | Walker et al. | Aug. 6, 1957 |
| 2,815,472 | Jackson et al. | Dec. 3, 1957 |
| 2,855,334 | Lehovec | Oct. 7, 1958 |
| 2,897,419 | Howland et al. | July 28, 1959 |